US009616771B2

(12) United States Patent
Grossard et al.

(10) Patent No.: US 9,616,771 B2
(45) Date of Patent: Apr. 11, 2017

(54) METHOD OF MANAGING THE ENERGY CONSUMED BY AN AUTOMOTIVE VEHICLE AND SYSTEM IMPLEMENTING SUCH A METHOD

(71) Applicant: COMMISSARIAT A L'ENERGIE ATOMIQUE ET AUX ENERGIES ALTERNATIVES, Paris (FR)

(72) Inventors: Mathieu Grossard, Montrouge (FR); Neil Abroug, Grenoble (FR); Guillaume Hamon, Velizy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/414,065

(22) PCT Filed: Jul. 10, 2013

(86) PCT No.: PCT/EP2013/064557
§ 371 (c)(1),
(2) Date: Jan. 9, 2015

(87) PCT Pub. No.: WO2014/009405
PCT Pub. Date: Jan. 16, 2014

(65) Prior Publication Data
US 2015/0202990 A1    Jul. 23, 2015

(30) Foreign Application Priority Data
Jul. 12, 2012   (FR) .................................... 12 56729

(51) Int. Cl.
*B60L 15/20*    (2006.01)
*B60L 3/12*    (2006.01)
(Continued)

(52) U.S. Cl.
CPC ............. *B60L 15/2045* (2013.01); *B60L 3/12* (2013.01); *B60L 11/1861* (2013.01);
(Continued)

(58) Field of Classification Search
CPC .. B60L 15/2045; B60L 13/12; B60L 11/1861; B60W 50/0097; G05D 17/02; G06Q 10/04; G06Q 10/06; G06Q 50/06
(Continued)

(56) References Cited

U.S. PATENT DOCUMENTS

2012/0010768 A1*  1/2012  Phillips ................. B60L 11/123
                                                             701/22
2014/0081503 A1*  3/2014  Grossard ................. B60L 1/003
                                                             701/22

FOREIGN PATENT DOCUMENTS

EP         1462300 A1     9/2004

OTHER PUBLICATIONS

Mathieu Grossard et al: "An optimal energy-based approach for driving guidance of full Electric Vehicles", Industrial Electronics (ISIE), May 28, 2012, pp. 1708-1713, XP032199962, DOI: 10,1109/ISIE.2012.6237348 ISBN: 978-1-4673-0159-6.*

(Continued)

*Primary Examiner* — Yazan Soofi
(74) *Attorney, Agent, or Firm* — Baker Hostetler LLP

(57) ABSTRACT

A method of managing the energy consumed by a motor vehicle, uses: a simulation unit incorporating a vehicle model predicting behavior of the vehicle and a driver model predicting behavior of the driver of the vehicle, the driver model receiving a speed setpoint and the speed of the vehicle measured at successive instants, and supplying a motor torque setpoint to the vehicle model which is a function of the speeds and of the modelled driver behavior; an optimization algorithm interacting with the simulation unit; the
(Continued)

method including trajectories composed of the trajectory of the speed setpoint and the trajectory of a setpoint for controlling an item of auxiliary equipment, the trajectory of a setpoint describing the variation of the setpoint as a function of the position of the vehicle, the trajectories being calculated with respect to given objectives according to the optimization algorithm whose variables are formed from the setpoints.

13 Claims, 7 Drawing Sheets

(51) Int. Cl.
    *B60L 11/18*    (2006.01)
    *B60W 50/00*    (2006.01)
    *G05D 17/02*    (2006.01)
    *G06Q 10/04*    (2012.01)
    *G06Q 10/06*    (2012.01)
    *G06Q 50/06*    (2012.01)
    *G06Q 50/30*    (2012.01)

(52) U.S. Cl.
    CPC ......... *B60W 50/0097* (2013.01); *G05D 17/02* (2013.01); *G06Q 10/04* (2013.01); *G06Q 10/06* (2013.01); *G06Q 50/06* (2013.01); *G06Q 50/30* (2013.01); *B60L 2240/12* (2013.01); *B60L 2240/622* (2013.01); *B60L 2240/642* (2013.01); *B60L 2240/68* (2013.01); *B60L 2250/16* (2013.01); *B60L 2250/18* (2013.01); *B60L 2250/30* (2013.01); *B60L 2260/44* (2013.01); *B60L 2260/54* (2013.01); *B60W 2540/30* (2013.01); *B60W 2550/143* (2013.01); *B60W 2550/402* (2013.01); *Y02T 10/645* (2013.01); *Y02T 10/705* (2013.01); *Y02T 10/7005* (2013.01); *Y02T 10/7044* (2013.01); *Y02T 10/7283* (2013.01); *Y02T 10/7291* (2013.01); *Y02T 10/84* (2013.01); *Y02T 90/16* (2013.01); *Y02T 90/162* (2013.01)

(58) Field of Classification Search
    USPC .......................................................... 701/22
    See application file for complete search history.

(56) References Cited

OTHER PUBLICATIONS

Salmasi F R: "Control Strategies for Hybrid Electric Vehicles: Evolution, Classification, Comparison, and Future Trends", IEEE Transactions on Vehicular Technology, IEEE Service Center, Piscataway, NJ, US, vol. 56, No. 5, Sep. 1, 2007, pp. 2393-2404, XP011192648, ISBN: 0018-9545, DOI: 10.1109/TVT.2007.899933.*

Tulpule P. et al: "Effects of different PHEV control strategies on vehicle performance", American Control Conference, 2009. ACC '09, IEEE, Piscataway, NJ, USA, Jun. 10, 2009, pp. 3950-3955, XP031487147, ISBN: 978-1-4244-4523-3.*

Mathieu Grossard, et al, "An Optimal Energy-Based Approach for Driving Guidance of Full Electric Vehicles", 2012 IEEE International Symposium on Industrial Electronics, May 28, 2012, pp. 1708-1713, IEEE, XP032199962.

Farzad Rajaei Salmasi, Control Strategies for Hybrid Electric Vehicles: Evolution, Classification, Comparison, and Future Trends, IEEE Transactions on Vehicular Technology, Sep. 1, 2007, pp. 2393-2404, vol. 56, No. 5, IEEE Service Center, Piscataway, NJ, USA, XP011192648.

Anthony M. Phillips, et al., "Vehicle System Controller Design for a Hybrid Electric Vehicle", Proceedings of the 2000 IEEE International Conference on Control Applications, Sep. 25-27, 2000, pp. 297-302, IEEE, New York, NY, USA, XP010528360.

P. Tulpule, et al., "Effects of Different PHEV Control Strategies on Vehicle Performance", 2009 American Control Conference, Jun. 10, 2009, pp. 3950-3955, IEEE, Piscataway, NJ, USA, XP031487147.

Xiao Lin, et al., "Optimal Energy Management for a Plug-In Hybrid Electric Vehicle: Real-Time Controller", 2010 American Control Conference, Jun. 30, 2010, pp. 5037-5042, XP031719188.

* cited by examiner

METHOD OF MANAGING THE ENERGY CONSUMED BY AN AUTOMOTIVE VEHICLE AND SYSTEM IMPLEMENTING SUCH A METHOD

CROSS-REFERENCE TO RELATED APPLICATIONS

This application is a National Stage of International patent application PCT/EP2013/064557, filed on Jul. 10, 2013, which claims priority to foreign French patent application No. FR 1256729, filed on Jul. 12, 2012, the disclosures of which are incorporated by reference in their entirety.

FIELD OF THE INVENTION

The present invention relates to a method of managing the energy consumed by a motor vehicle. It also relates to a system implementing such a method. It is applicable, notably, to electric vehicles and in other fields.

BACKGROUND

Increasing numbers of all-electric vehicles are being used, notably in urban areas. The use of electric vehicles yields numerous advantages. The batteries are critical components of these types of vehicle. More generally, the management of energy for these vehicles is a completely different problem from that of thermal vehicles running on fossil energy.

In particular, batteries fitted in electric vehicles have a finite energy capacity. Moreover, the electrical recharging of a battery takes a very long time. Therefore it is essential for the driver of a vehicle of this type to be certain that the amount of energy stored in the batteries is sufficient to cover a desired route while activating the auxiliary equipment for providing passenger comfort.

For vehicles with combustion engines, the question of managing auxiliary equipment (heating, air conditioning, and the like) does not arise, because fossil energy is available on road networks at numerous rest stops. Thus the strategy for managing the auxiliaries is reduced to satisfying the driver's requests. In the case of electric vehicles, it may rapidly become impossible to use this simple strategy. Storage capacity is limited and recharging facilities are lacking at the present time. If requests for comfort are met at all costs (using the heating, car radio, and other auxiliary equipment), the energy resources of the battery may be rapidly exhausted. This may adversely affect the purpose of the mission, which is to arrive at the route destination.

If an energy management strategy is implemented to minimize energy consumption, meet the constraint of reaching the destination, and satisfy requests for comfort, it may become constraining for the driver. This is because these criteria may impose a very slow driving style and fail to meet the driver's requests in terms of speed.

Numerous articles describe solutions for implementing energy management systems in hybrid, combustion engine and electric vehicles. These systems are also referred to as EMS, an acronym for the English expression "Energy Management Systems". The term EMS may be used subsequently.

As a general rule, these articles describe energy management strategies having the aim of finding the best scenario for activating the combustion engine and/or electric motor at a given instant, on the basis of criteria relating to the consumption and/or pollution emission of a vehicle. Where purely electric propulsion is used, these strategies cannot provide simultaneous management of the comfort requirements of vehicles, notably requests for auxiliary equipment, the power consumption of the battery, and the performance specifications of vehicles such as the journey time.

In the field of energy management for purely electrically propelled vehicles, patent application EP1462300 A1 may be cited. In this document, the aim is to enable the driver to manage the battery charging and discharging level, using certain information supplied to the vehicle driver. A drawback of the proposed solution is that it requires the use of a battery charger, which is a major constraint.

These prior art solutions, therefore, do not resolve the problem encountered by drivers, notably drivers of all-electric vehicles. This is because the driver needs, above all, to be certain that the amount of energy stored in the batteries is sufficient to cover the route. If the amount of energy is insufficient to provide reliable assurance that the destination will be reached, the driver must be offered a driving style which will enable him to reach the destination. This objective must be met, regardless of the identity of the vehicle driver. Furthermore, since the maximum storage capacity of present-day batteries is still far too low, care must be taken to avoid wastage, in order to minimize energy consumption.

SUMMARY OF THE INVENTION

One object of the invention is therefore, notably, to provide optimal setpoints that a driver must apply in order to minimize both the journey times and the energy consumption while providing the best response to the requests for activation of the auxiliary equipment, regardless of the identity of the driver.

For this purpose, the invention proposes a method of managing the energy consumed by an automotive vehicle, for a given route between a point of departure A and a point of arrival B, said method using at least:
  a simulation unit incorporating a vehicle model predicting the behavior of said vehicle and a driver model predicting the behavior of the driver of said vehicle, said driver model receiving at its input a speed setpoint to be attained and the speed of said vehicle measured at successive instants, and supplying a motor torque setpoint to said vehicle model which is a function of said speeds and of the modeled driver behavior;
  an optimization algorithm interacting with said simulation unit;
  said method including a set of trajectories composed of the trajectory of said speed setpoint and at least the trajectory of a setpoint for controlling an item of auxiliary equipment, the trajectory of a setpoint describing the variation of said setpoint as a function of the position of the vehicle, said trajectories being calculated with respect to given objectives according to said optimization algorithm whose variables are formed from said setpoints, said method including a preliminary step including:
  a sub-step of storing an approximate profile (2) of said route in the form of segments XL of straight lines, forming a first sequences of sampled positions XL(k) along the route, a sampled position XL(k) corresponding to the movement from one segment to the next segment;
  a sub-step of sampling said profile according to a spatial interval Xe, forming a second sequence of sampled positions Xe(j) along the route, the sampled positions Xe(j) being located within the segments XL;
the trajectories of said setpoints being recalculated at each sampled position XL(k) of the first sequence according to the optimization algorithm, a simulation predicting the energy environment of the vehicle and the behavior of said driver up to the point of arrival B as a function of said setpoints and at least of the approximate profile of the remaining route, the optimization algorithm recognizing the result of the simulation for the calculation of the setpoints of the trajectories.

The vehicle is, for example, propelled by means of a single energy source.

In a specific embodiment, the optimization algorithm is a particle swarm meta-heuristic, a particle being composed of said setpoints.

The driver model may be a speed corrector of the proportional integral (PID) type. It includes, for example, a correction representative of the anticipatory action of the driver in response to a type of event.

The type of event is, for example, a change of gradient on said route.

The driver model is, for example, calculated over at least a portion of said given route, said model being calculated by performing a linear regression based on the value of the applied motor torque, the measured speed of the vehicle, and the setpoint speed at points of said given portion.

The segments of the approximated profile are, for example, a function of the elevation of the route and/or the changes in the speed limit.

A segment represents, for example, a route section having a constant gradient and/or a constant speed limit.

The predicted energy environment may include the state of the energy resource.

The energy environment includes, for example, the speed of the vehicle, the remaining travel time and at least one output variable of an auxiliary item of equipment.

The simulation is, for example, also carried out on the basis of the traffic conditions on the remainder of the route.

Since a plurality of given objectives are each composed of a combination of one or more objectives included in a set of objectives, a plurality of sets of trajectories are, for example, provided for the same setpoint, a trajectory being calculated with respect to a combination of objectives.

Since the vehicle uses electrical energy, and the energy resource is electrical batteries, the combinations of objectives are, for example, created among the following objectives O1, O2, O3:
  O1: to minimize the total electrical charge consumed by the batteries, the charge transmitted to the electric motor and the energy transmitted to the item of auxiliary equipment;
  O2: to minimize the journey time between the point of departure A and the point of arrival B;
  O3: to minimize the difference between the requested output of the item of auxiliary equipment and the actual output of said equipment.

The invention also proposes a system for managing the energy consumed by an automotive vehicle over a given route, characterized in that said system includes at least:
  means for capturing the position of said vehicle on said route;
  means for measuring the torque applied by the motor of said vehicle and its speed;
  means for measuring the state of the energy resource of said vehicle;
  means providing output information from at least one item of auxiliary equipment;
  a computer adapted to be placed on board of said vehicle and interfaced with said means, said computer incorporating
  a simulation unit incorporating a vehicle model predicting the behavior of said vehicle and a driver model predicting the behavior of the driver of said vehicle, said driver model receiving at its input a speed setpoint to be attained and the speed of said vehicle measured at successive instants, and supplying a motor torque setpoint to said vehicle model which is a function of said speeds and of the behavior of the modelled driver; and
  an optimization algorithm interacting with said simulation unit; and executing the method as described above.

BRIEF DESCRIPTION OF THE DRAWINGS

Other characteristics and advantages of the invention will be evident from the following description, which makes reference to the attached drawings, showing.

DETAILED DESCRIPTION

Figure 1:
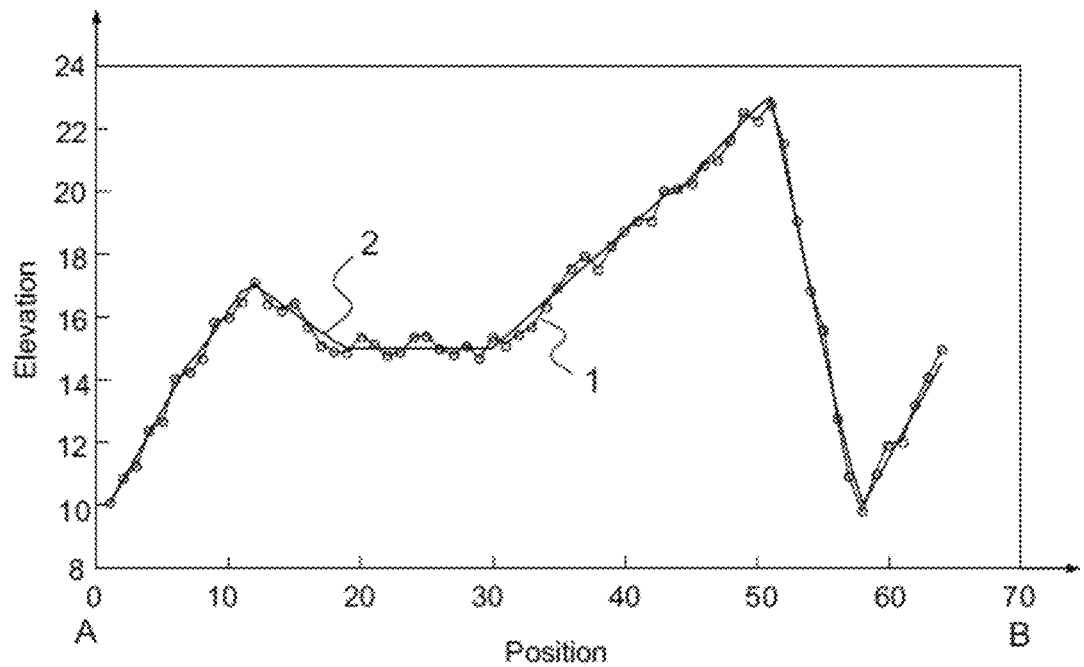
in FIG. 1, the actual profile of an example of a route to be traveled by a vehicle, and its approximated profile.

FIG. 1 shows the profile of an example of a route to be traveled by a vehicle, between a point of departure A and a point of arrival B. In particular, it shows the elevation of the road as a function of the position of a vehicle along this route. The actual profile 1 of the road is approximated by a linear function 2, using a set of segments.

The invention is described for application to a vehicle, notably a vehicle propelled by means of a single energy source. Thus the invention may be applied to a vehicle with all-electric propulsion, by using a battery which is the sole provider of energy to the electric propulsion motor.

The application of the invention requires the use of an electronic computer located in the vehicle and capable of collecting via a communication protocol, for example a protocol of the CAN type, a set of signals which are representative, notably, of the battery charge level, the forward speed of the vehicle, and the level of use of the auxiliary equipment. This computer incorporates a simulator of the vehicle so that it can predict the energy consumption over the journey. The invention also uses, for example, a GPS in order to obtain future road information concerning the inclination of the road. Road traffic information obtained via GPS may also be used advantageously.

In the rest of the description, the heating will be considered, by way of example, as the sole auxiliary equipment in the vehicle. Other auxiliary equipment could be recognized, particularly audio equipment, air conditioning and interior lighting, for example. As a general rule, the invention recognizes at least the electric motor and the propulsion system of the vehicle, together with at least one item of auxiliary equipment for passenger comfort. The following two control variables X, or setpoints, will be recognized subsequently:

the speed desired by the driver; and the requested heating setting.

The invention recognizes the driver's behavior in the EMS loaded into the aforementioned computer. For this purpose, a driver model is defined. The driver model may be extracted from running profiles known in advance and used for other journeys. It may also be identified on line at the start of each road route or at particular instants of the journey.

In prior solutions, most on-board strategies recognize only the mechatronic elements of the vehicle, for example the motor efficiency map, a simplified model of the battery, or a loss model of the ancillary auxiliary equipment.

The modelling of the driver behavior used by the invention is as follows: the driver wishes to attain a reference speed at a given instant of the journey. Depending on the profile of the road and certain information relating to his vehicle, the driver will apply more or less pressure to the accelerator pedal; in other words, he will supply a torque setpoint for the propulsion system. This is done for the purpose of attaining the reference speed. Thus the driver may be considered as a speed corrector. The method according to the invention then directly recognizes the torque setpoint output by this corrector, which is representative of the driver's behavior.

Figure 2:
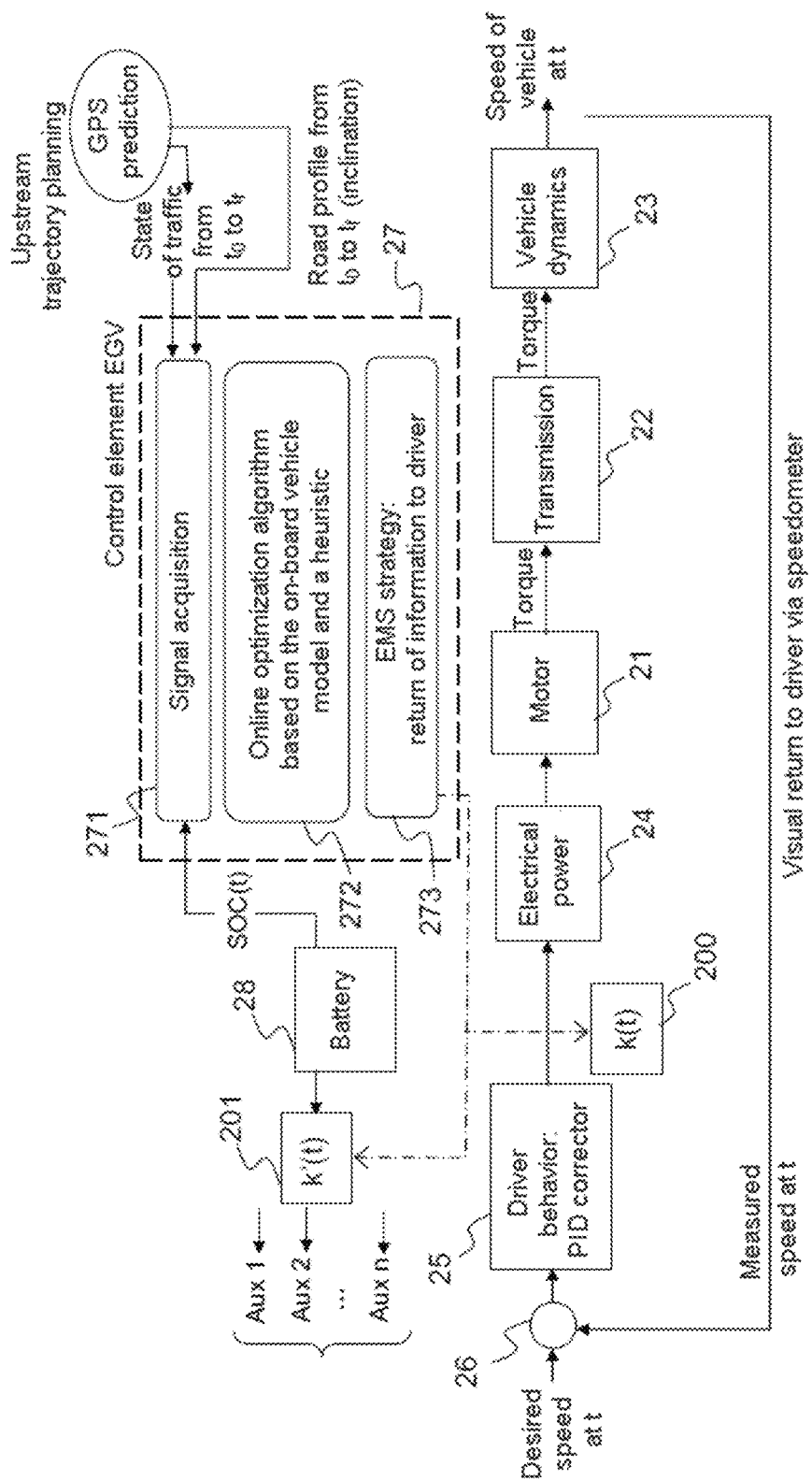
in FIG. 2, an illustration of the integration of the method or of a device according to the invention into the propulsion system of an electric vehicle.

FIG. 2 shows the integration of the method or of a device according to the invention into the propulsion system of an electric vehicle.

The propulsion system conventionally includes an electric motor 21 transmitting a torque to a transmission element 22 which transmits a torque to the dynamic elements of the vehicle 23, notably the drive wheels. A power electronics system 24 forms the interface between the command and the motor.

According to the invention, a control loop is added at the same time as the addition of a speed corrector module 25, the correction made being a function of the driver's behavior. For this purpose, the speed of the vehicle is measured at instants t and sent to a comparator delivering a value $\Delta V$ corresponding to the difference between the desired speed and the measured speed. The speed corrector module 25 models, notably, the way in which the driver responds to this value $\Delta V$.

A control element 27 of the vehicle, called the EGV element, makes a prediction of the state of the vehicle at future instants of the journey. This element includes a signal acquisition module 271. By means of this module, the control element acquires the battery charge level as a function of time, called SOC(t), an abbreviation of the English expression "State Of Charge". It also acquires the road profile between the points A and B as shown in FIG. 1, that is to say between the initial instant $t_0$ and the final instant $t_f$. It also acquires all the information supplied by the GPS 29.

The EGV element also includes a module 272 executing the on-line optimization steps all the way along the route, on the basis of the vehicle model and the driver model and a heuristic which is described below, this heuristic also being applied to the driver model.

A module 273 applies the EMS strategy by offering the vehicle control information to the driver, in relation to both the speed 200 and the control of the auxiliary equipment 201.

The introduction of the driver's behavior makes it possible to predict, for future instants of the journey A-B, the transient conditions that should be provided by the driver simulated in this way, in order to attain the setpoint speed. Advantageously, this enables the energy consumption of the vehicle associated with a given driver to be predicted as accurately as possible.

Figure 3:
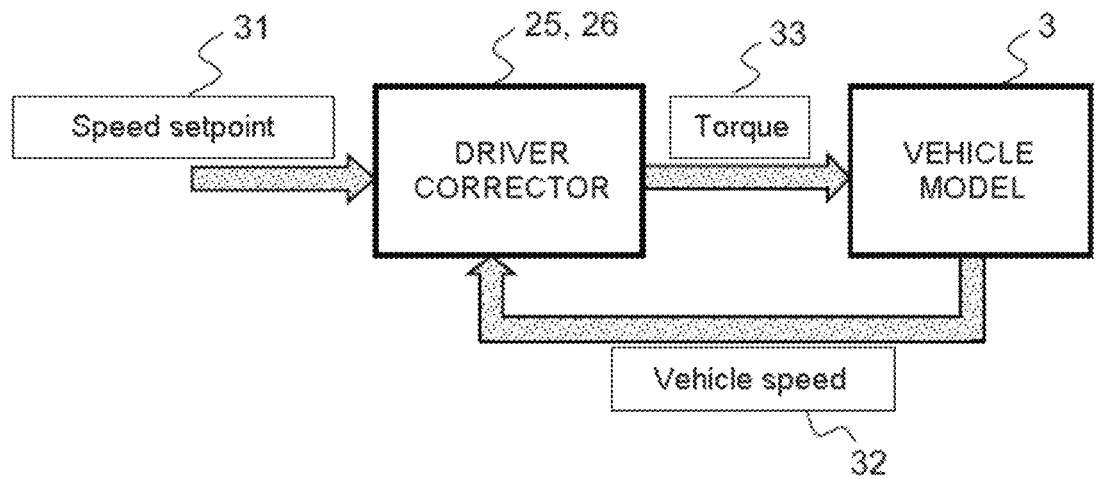
in FIG. 3, an illustration of the integration of the speed corrector associated with an identified driver and the generation of the resulting torque setpoint.

FIG. 3 shows the integration of the speed corrector associated with an identified driver and the generation of the resulting torque setpoint. In the diagram of FIG. 3, the speed correction includes the correction module 25 and the comparator 26 of FIG. 2. The corrector therefore receives at its input the speed setpoint 31 which is to be attained and which is desired by the driver, together with the value of the actual speed 32 of the vehicle at an instant t. The corrector supplies at its output a reference torque value 33 as the setpoint for the motor. This corrector is a proportional-integral-derivative (PID) speed corrector. This corrector also has, for example, an anticipatory action, called "feed-forward" in the English literature, which is representative of the driver's anticipatory action in response to gradient of the road. In fact, if the driver observes that he is about to ascend a hill, he will anticipate the change in the height profile by pressing the accelerator pedal more strongly, and will act in the opposite way when negotiating a descent. This is a mechanism similar to that of the speed control in motor vehicles. The addition of these two values, namely the PI correction and the feed-forward action, forms the value 33 of the torque applied to the motor and consequently forms the input of the vehicle model 3 on the basis of which the control element 27 implements the EMS of the vehicle. The anticipation may relate to a type of event other than a change in the height profile.

A speed corrector is therefore adapted to each user. There are several possible solutions for determining the characteristics of a speed corrector characterizing a driver model.

Figure 4:
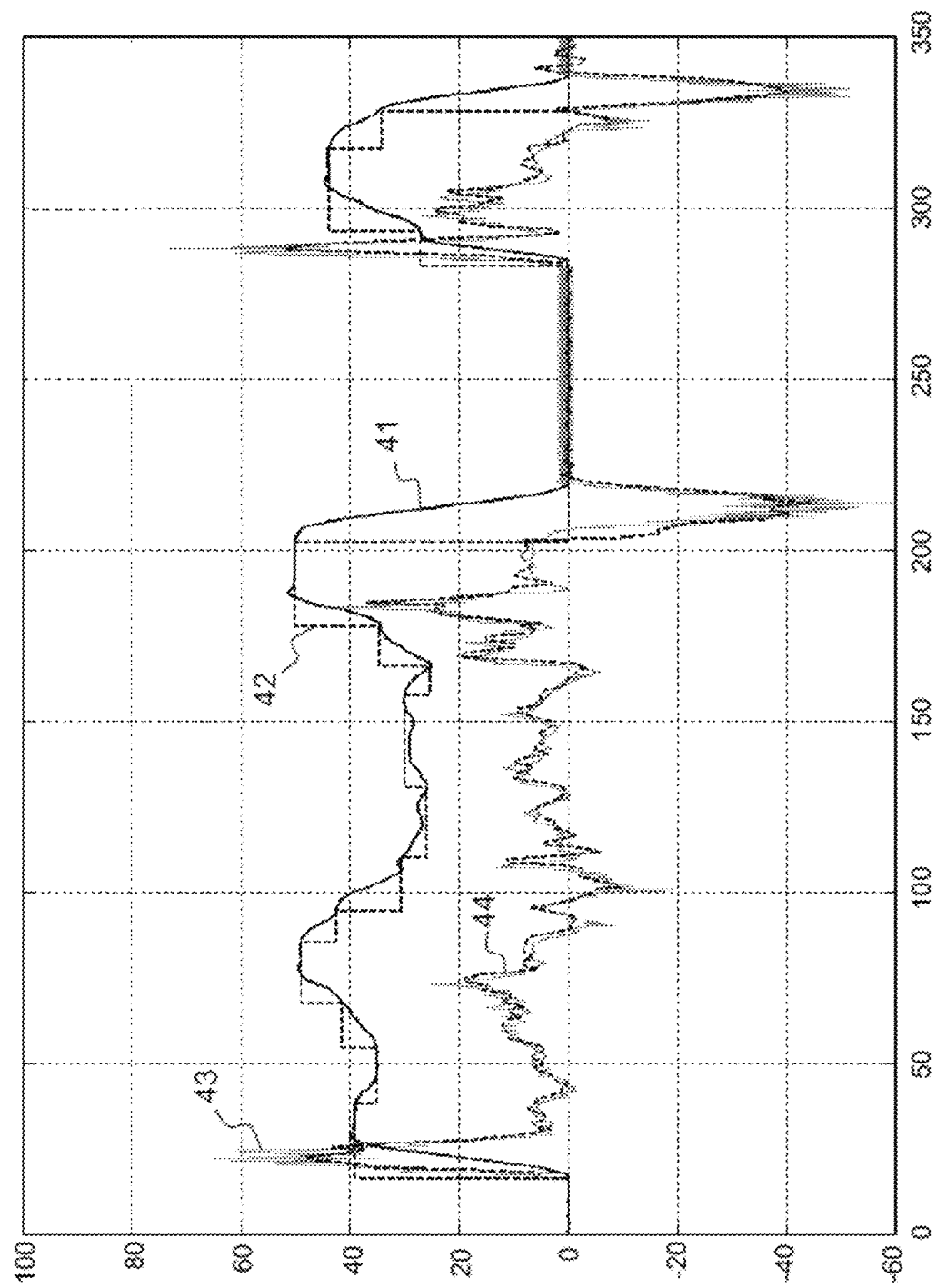
in FIG. 4, an example of the identification of a corrector with a given driver.

FIG. 4 shows an example of the identification of a corrector with a given driver, enabling a driver model to be created.

In this example, the behavior of the driver is extracted from a running profile based on a given journey. The speed corrector is calculated by carrying out a linear regression between the applied torque, the speed desired by the driver, and the actual speed of the vehicle. The corrector representing the driver's behavior has been integrated into the simulation model incorporated into the correction module 25.

FIG. 4 shows the actual speed of the vehicle, i.e. the measured speed, over a given journey, in the form of a first curve 41. A second curve 42 represents the associated speed setpoint which is generated automatically. This speed setpoint 42 corresponds to the speed desired by the driver, that is to say the speed he wishes to attain. A third curve 43 represents the value of the motor torque that is actually applied. All the values 41, 42, 43 may be acquired by known means throughout the given journey, and more particularly in the portions of this journey. The two speed curves 41, 42 and the torque curve 43 are used in order to identify a driver behavior, composed of a linear dynamic of speed correction and an anticipation of the gradient of the road. If this corrector 25, 26 is applied to the system and the speed setpoint 31 is injected at the input, together with the measured speed 32, a fourth curve 44 is obtained, representing the torque estimated on the basis of the learnt driver model. These estimated torque values 44 will be the torque setpoints applied to the motor, during the recognition of the speed corrector, and therefore of the driver's behavior.

The estimated torque curve 44 closely resembles the motor torque represented by the third curve 43, confirming that this method of representing the driver by means of this speed corrector is effectively identified.

It should be noted that the speed corrector is completely defined by a finite set of several numeric parameters. These define the driving style of the driver, for example the use of brief or slow acceleration, the greater or lesser degree of anticipatory action, and the like. Thus, for each given corrector, the corrector must be capable of adapting this set of parameters. According to the invention, this set of parameters is, for example, identified by an on-board procedure throughout the journey, at different instants. Thus the invention makes it possible to recognize any driver, and if a driver changes his driving style, when moving from an urban area to an urban fringe area for example, the invention also makes it possible to recognize this change in behavior.

As mentioned above, the following two control variables X, or setpoints, will be considered:
  the speed setpoint;
  the requested heating setting, for example.
The torque requested from the motor is then a function of the difference between the setpoint speed $V_{consigne}$ (desired by the driver) and the actual speed of the vehicle $V_{véhicule}$. If f denotes this function and Cp denotes the motor torque, then $Cp=f(V_{consigne}, V_{véhicule})$, the function f describing the driver's behavior. It is defined by the speed corrector 25.

In the electric vehicle in question, regenerative braking phases can be executed. Thus the requested motor torque may be positive, in the case of propulsion, or negative, in the case of deceleration.

The corresponding speed variable V is, for example, input as a percentage of its maximum permissible value. The heating position variable is an integer variable. Each position corresponds to a fixed power level for heating the passenger compartment of the vehicle.

In the context of the invention, the trajectory of a variable X corresponds to the change of this variable as a function of the position, from the point of departure A to the point of arrival B. Thus the trajectory of the speed is the value of the speed at each position on the route. The trajectories are therefore described with respect to a spatial reference rather than to a temporal reference, for the following two reasons in particular:
  the route is known in advance via the position coordinates and GPS information, the arrival time being unknown and forming an optimization parameter;
  some variables of the vehicle model for the simulation are a function of the position or the elevation; for example, the requested torque, and therefore the speed, essentially varies with elevation.

For the prediction, the two variables, namely the requested speed and the requested heating setting, are calculated over the whole route. For this purpose, the route is sampled according to a spatial interval Xe, tests being conducted at each of the sampled positions according to a management algorithm, an example of which is described below. It should be noted that a large number of samples may be considered over a relatively long route. By way of example, let Xe be 200 meters.

A second category of spatial samples XL is introduced, the samples XL being, for example, defined by the segments 2 approximating the route profile, each segment corresponding to a sample XL. In particular, the spatial samples XL correspond to locations on the route where the optimization algorithm, described below, is restarted to refresh all the setpoints, in terms of both speed and heating. Between two instants XL and XL+1, oversampling is carried out at the spatial interval Xe, where Xe is much smaller than XL. A speed and heating setpoint is assigned to each interval Xe.

A global objective of the energy management strategy in a vehicle is to determine the optimal values of these two variables over the whole of the sampled route, for example with respect to the following three objectives O1, O2, O3:
  O1: to minimize the total electrical charge consumed by the batteries or any other type of energy resource, the charge transmitted to the electric motor, and the energy transmitted to the heating system;
  O2: to minimize the journey time between the point of departure and the point of arrival;
  O3: to minimize the difference between the passenger compartment temperature requested by the driver and the temperature actually provided in the passenger compartment by the action of the heating system.

For auxiliary equipment other than the heating system, the objective O3 may be formulated as follows:
  O3: to minimize the difference between the requested output of the item of auxiliary equipment and the actual output of said equipment.

In addition to these objectives, the management strategy must meet a number of constraints, including, for example, the following constraints C1, C2, C3, C4:
  C1: the instantaneous charge of the batteries must always be above a fixed threshold, in order to preserve the battery life;
  C2: the journey time must be below a fixed threshold;
  C3: the difference between the requested temperature and the actual temperature must not exceed a fixed threshold;
  C4: the speed of the vehicle must not exceed a certain threshold, in order to conform to the speed limits along the route.

It should be noted that, in the case of a vehicle with a combustion engine, the last two objectives can easily be attained, because the energy reserve has infinite capacity and can be rapidly refilled with available fuel. In the case of an electric vehicle, these two objectives are not so easy to attain. The management strategy implemented by the invention carries out, notably, arbitration between these contradictory objectives, while meeting the stated constraints.

Between a point of departure A and a point of arrival B, the set of trajectories considered is composed of the mechanical torque supplied by the motor and the heating setting, together with, for example, the state of charge (SOC) of the batteries, the speed of the vehicle, the journey time, and the temperature of the passenger compartment. The trajectory of each of these items of information may be represented by a curve representing their value as a function of the position of the vehicle along the route between point A and point B.

One objective of the energy management strategy according to the invention is to provide three sets of trajectories between points A and B, namely a set of low trajectories, a set of high trajectories, and a set of trajectories called pseudo-optimal, these trajectories being capable of being defined as follows:

Low trajectories: these trajectories are found by taking objectives O1 and O3 into account, and the term "low" is used because the speed of the vehicle resulting from this optimization is theoretically lower than the speeds obtained by considering the other sets of objectives;

High trajectories: these trajectories are found by taking only objectives O2 and O3 into account, and in these trajectories the speed of the vehicle should be higher than the speed obtained using the low trajectories;

Pseudo-optimal trajectories: these are the trajectories found by taking the three objectives O1, O2 and O3 into account simultaneously.

Preferably, these trajectories are offered to the vehicle driver in a user-friendly form. The driver can then decide to accelerate or brake, and to change the heating power setpoint. The three sets of trajectories are used, notably, to assist the driver and to reassure him that it is possible to reach the destination of his route with the stored amount of electrical energy. The invention can be used to offer optimal trajectories to the driver according to his preferences and according to his driving style, for example.

Figure 5:
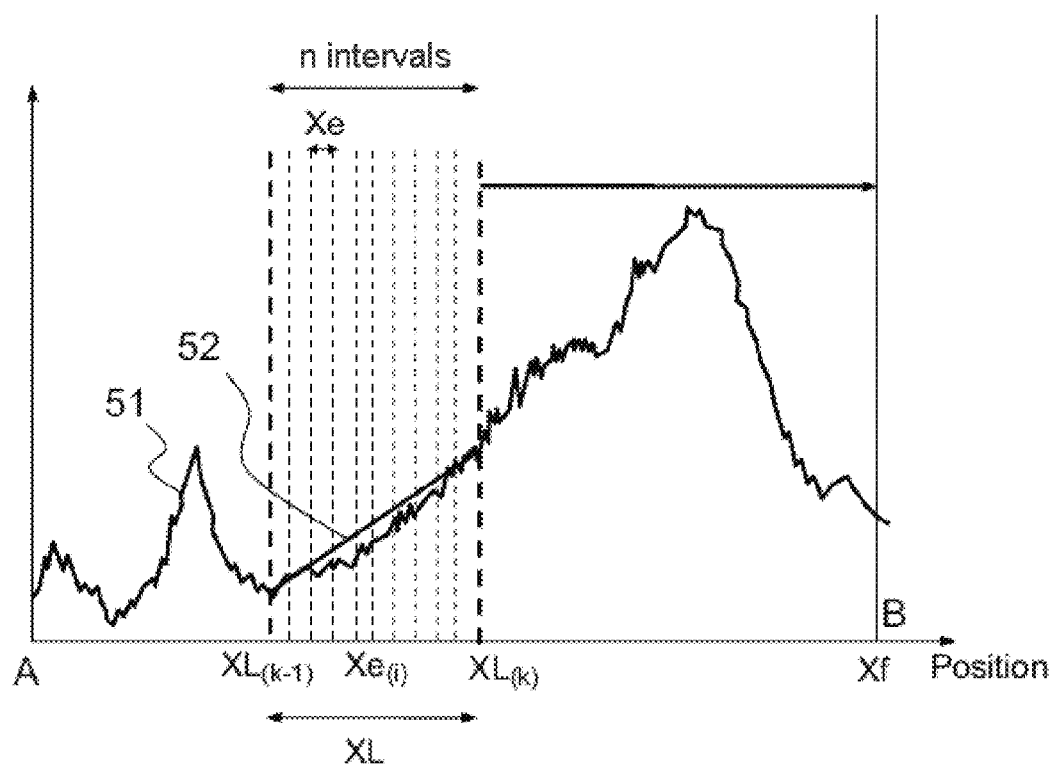
in FIG. 5, an illustration of examples of spatial sampling along the approximated route.

FIG. 5 shows the spatial samplings Xe and XL defined above for a given route profile represented by a curve 51. The samples Xe are represented inside a segment 52 framed by two values of samples XL. A represented segment 52 is, for example, a route section having a constant gradient and/or a constant speed limit.

At the point of departure A, the three sets of trajectories are calculated and determined as a function of the known information about the route. These trajectories are updated at specific points corresponding to the instants of spatial sampling. At an updating point, the three sets of trajectories are recalculated on the basis of the history, the remaining route profile, the outside temperature and the measurements collected at this point. These measurements indicate, for example, the state of charge of the batteries, the temperature of the passenger compartment, and the journey time up to this point. The history comprises, notably, the recordings of the trajectories calculated at the preceding sampling instants.

The optimal trajectories are calculated on the basis of a formulation of the EMS management problem as a single-objective optimization problem under constraints containing a plurality of decision variables.

Reference will be made to FIG. 5. At the k-th updating point of the journey, which is the sampled position XL(k) of the series XL, the objective is to determine the optimal trajectories up to the final position Xf. The preceding update took place at point XL(k−1), and points XL(k−1) and XL(k) frame a segment 52. In the example of FIG. 5, two consecutive segments are not collinear, which in practice means that a move from one segment to another takes place when there is a change of inclination in the route gradient. However, cases may be envisaged in which two consecutive segments are collinear, without any change of inclination; for example, a segment may be divided if it is too long. Inside the segments, up to the final position Xf, the route is sampled at an interval of Xe.

For the update at point XL(k), the segment break point, it is necessary to determine the requested speeds and heating settings predicted up to the final position Xf, at point B. These variables, namely the speed and the heating setting, are determined so as to minimize a criterion using the three objectives O1, O2 and O3 of the preceding section XL(k−1), XL(k) 52, while allowing for the four constraints C1, C2, C3 and C4.

Figure 6:
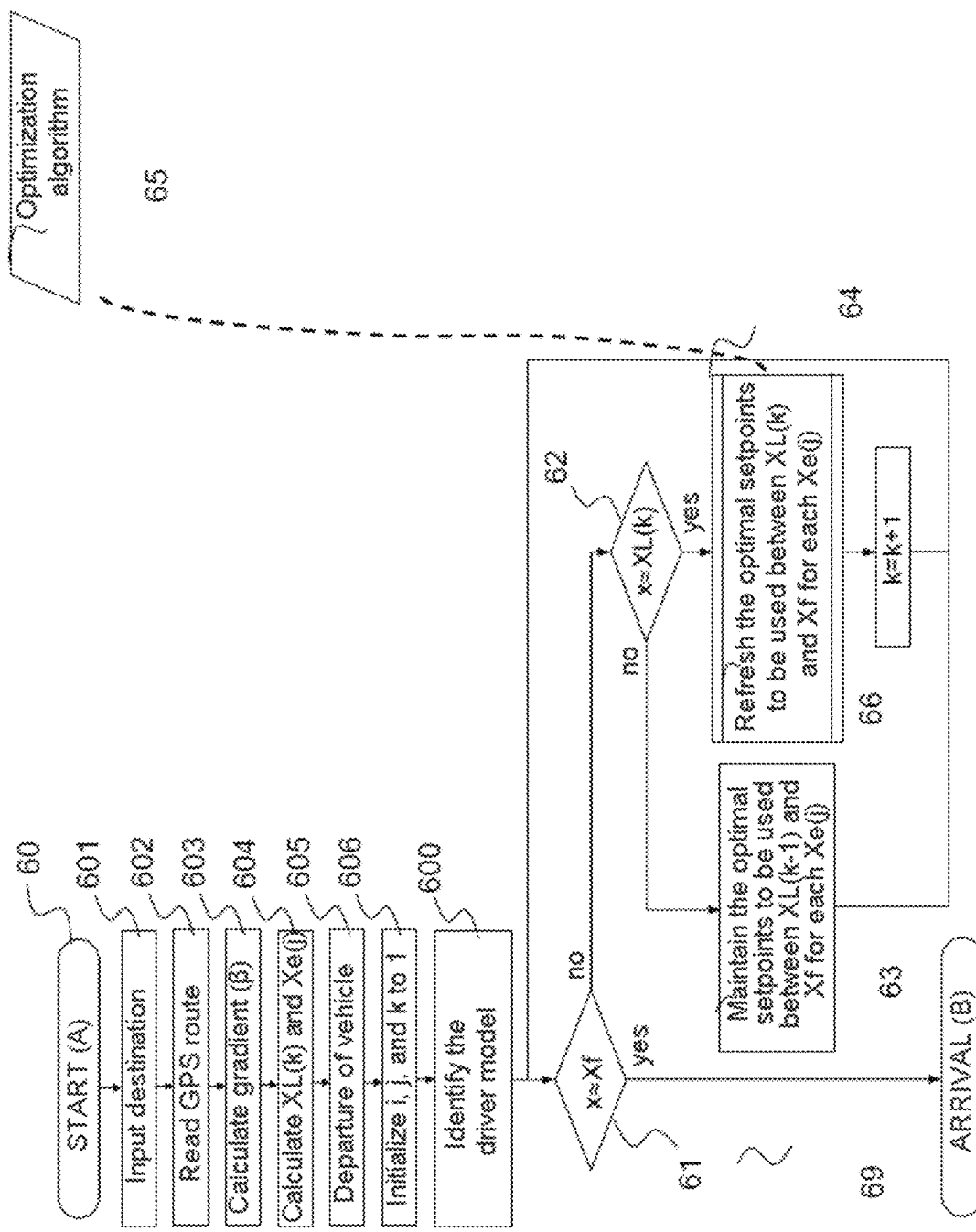
in FIG. 6, a flow diagram of an example of a general algorithm implementing a method of energy management according to the invention.

FIG. 6 shows the flow chart of an example of a general algorithm implementing an example of an EMS according to the invention, from the starting of the vehicle at a point A to a point of arrival B which is the final destination.

On starting 60, in a preliminary step, at point A, a number of operations are, for example, performed:

601: inputting the geographic coordinates of the destination;

602: reading the route by means of the GPS device; the route profile may be approximated during this step;

603: calculating the temperature gradient on the route according to the available meteorological information;

604: determining the two series of sampled positions XL and Xe on the basis of the approximated profile 2, as shown in FIG. 1 for example;

306: giving the command to start the vehicle, resulting, notably, in the activation of the motor torque;

Setting the indices i, j and k to 1, these indices corresponding, respectively, to a sampling time interval Te along the route, to the spatial sampling interval Xe, and to the spatial sampling interval XL for the updating of the optimal setpoints.

When starting has been performed, the GPS regularly transmits the actual position of the vehicle on the journey.

The departure of the vehicle is followed by a step 600 of identifying the driver behavior, resulting in the creation of the speed corrector. During this identification step, the EMS identifies, for example, the driver model, using the torque and speed measurement data sent by the electric vehicle control unit (UCVE). This unit serves, notably, to control all the low-level electrical functions, and to acquire the journey data such as the measurements of speed or torque. The identification phase ends when it is decided that the input/output signals (speed/torque) of the future corrector are sufficiently rich in terms of frequency to allow an effective corrector to be designed. A linear regression on the torque and speed values is then, for example, used to define the coefficients of the speed corrector, the latter being integrated into the simulation model of the EMS, which is described below. As soon as this identification step 600 is completed, the algorithm can be executed. The identification of the driver model can also be repeated, over the whole length of the route.

The algorithm starts and then continues with a sequence of two tests 61, 62. These tests are performed according to the temporal sampling interval Te; that is to say, the tests are performed once every Te. A position sampled according to Te is denoted X(i).

In a first test 61, the position X(i) is compared with the final value Xf. If the value X(i) is substantially equal to the value Xf, which is also stored, the vehicle has reached the point of arrival B and is at its final destination 69. If this is not the case, the position X(i) is compared, in a second test 62, with a sampled setpoint change position XL(k). If the value X(i) is not equal to XL(k), the optimal setpoints to be applied between the point XL(k−1) and the final point Xf are maintained 63 for all the positions Xe(j). If the value X(i) is substantially equal to XL(k), the refreshment of the optimal setpoints is applied for each position Xe(j) between the position XL(k) and Xf 64. The position XL(k) is incremented by an interval XL, XL(k+1) for the next test 62. After this test, at the end of which the setpoints are maintained 63 or refreshed 64, the algorithm loops back to the first test 61 where the interval X(i+1) is compared with the position Xf, and then, if Xf is not reached, X(i+1) is compared with XL(k) or XL(k+1), depending on whether or not XL has been incremented.

The positions X(i) and XL(k) do not necessarily coincide, and therefore a distance range Lε is provided, such that

|XL(k)−X(i)|<Lε signifies that the position XL(k) has been reached. The same applies to Xf. The positions of the vehicle are detected by positions sensors, for example by using a GPS, the distance Lε allowing for measurement uncertainties.

The setpoints are refreshed, or updated, by means of an optimization algorithm, for example.

The optimization algorithm is of the particle swarm type, for example. Clearly, it is possible to use other meta-heuristics such as genetic algorithms or ant colony algorithms, for example. The optimization problem may be formulated as the minimization of a single-objective function under a constraint. The single-objective function is the weighted sum of the objectives O1, O2, O3. This problem is formulated in this way in the following table for a position X(i), denoted $X_i$, coinciding with a position XL(k):

$$\text{minimize} \begin{cases} \alpha \times O1(Cp, Pc, Etat\_i, Param\_trajet) + \\ \beta \times O2(Cp, Pc, Etat\_i, Param\_trajet) + \\ \gamma \times O3(Pc, Etat\_i, Param\_trajet) \end{cases}$$

where
$\alpha$, $\beta$, and $\gamma$: Weighting coefficients
Cp: torque requested from the motor from $X_i$ to $X_f$ (percentage of the maximum propulsion torque and maximum braking torque)
Pc: heating setting from $X_i$ to $X_f$ (integer)
Etat_i: state of the vehicle (battery charge, passenger compartment temperature, vehicle speed, etc.)
Param_trajet : parameters relating to the route (length, route profile, outside temperature, etc.)
subject to the following constraints:

$$\begin{cases} -1 \leq Cp \leq 1 \\ 0 \leq Pc \leq nPcMax \\ Etat\_min \leq Etat \leq Etat\_max \end{cases}$$

where
Etat_min and Etat_max: minimum and maximum state of the vehicle
nPcMax : Maximum power requested from the heating In the above table, n corresponds to a discrete position of the heating setpoint. The speed $C_p$ is normalized and varies between −1, for the minimum speed, and +1, for the maximum speed.

It should be noted that the change from one optimal trajectory to another is carried out by applying different weighting to the objective function to be minimized according to the values α, γ, γ.

This optimization problem is single-objective under constraint, with a very large search space. It must also simultaneously recognize variables with real values, such as the value of the requested speed, and with integer values, such as the heating setting.

This optimization problem may be difficult to solve by currently used optimization techniques. The difficulty can be overcome by using a meta-heuristic. The particle swarm optimization algorithm, which is an iterative algorithm, has the advantage, notably, of being simple to implement in an on-board computer of a vehicle. It is a method based on the existence of a population of particles, corresponding to the solutions, which move in the search space for acceptable solutions. Each particle has a memory enabling it to find its best position, according to the optimization criterion. It also has access to the best positions of its neighbors. The particle has a flight plan, allowing it to know its future destination in the search space. This flight plan is calculated on the basis of its best position in the past, the best position of the set of particles, and its last movement vector, referred to as the speed, although this is a misnomer. In the present invention, a particle corresponds to a set of the state variables of the system. In the present example, a particle corresponds to the requested speed and the heating setting n. For example, a particle corresponds to:
Vp=10% of the maximum speed;
n=4.

The future position of a particle i is determined by means of the two equations shown in the table below:

Eq. 1:

$$\begin{cases} V_i(t+1) = \omega \times V_i(t) + c_1 \times r_1 \times (P_i(t) - P_i^{best}(t)) + c_2 \times r_2 \times (P_i(t) - P_{glob}^{best}(t)) \\ P_i(t+1) = P_i(t) + \chi \times V_i(t+1) \end{cases}$$

where
$V_i(t)$: velocity or movement vector at iteration t
$P_i(t)$: position vector at iteration t
$P_i^{best}(t)$ : best position vector of particle i
$P_{glob}^{best}(t)$: best position vector of all particles
$r_1$, $r_2$: random numbers between 0 and 1
$\omega$, $c_1$, $c_2$, $\chi$: algorithm adjustment parameters To make this meta-heuristic more robust and to provide convergence toward the global optimum, the following operations may be performed:
deterministic or random dynamic variation of certain parameters of the algorithm;
limitation of the displacement vector to prevent excessively large displacements, which may tend to make the particles depart from the domain of acceptable solutions, or to confine them within the boundaries of the search space;
introduction of the mutation operator, already used in genetic algorithms, to prevent the stagnation of the particles or premature convergence toward a local optimum.

For integer variables, such as the heating settings, a simple method is that of relaxing the integrity constraint by allowing the use of real variables. To submit these variables to evaluation via a simulation model, the real value is approximated by the nearest integer.

Figure 7:
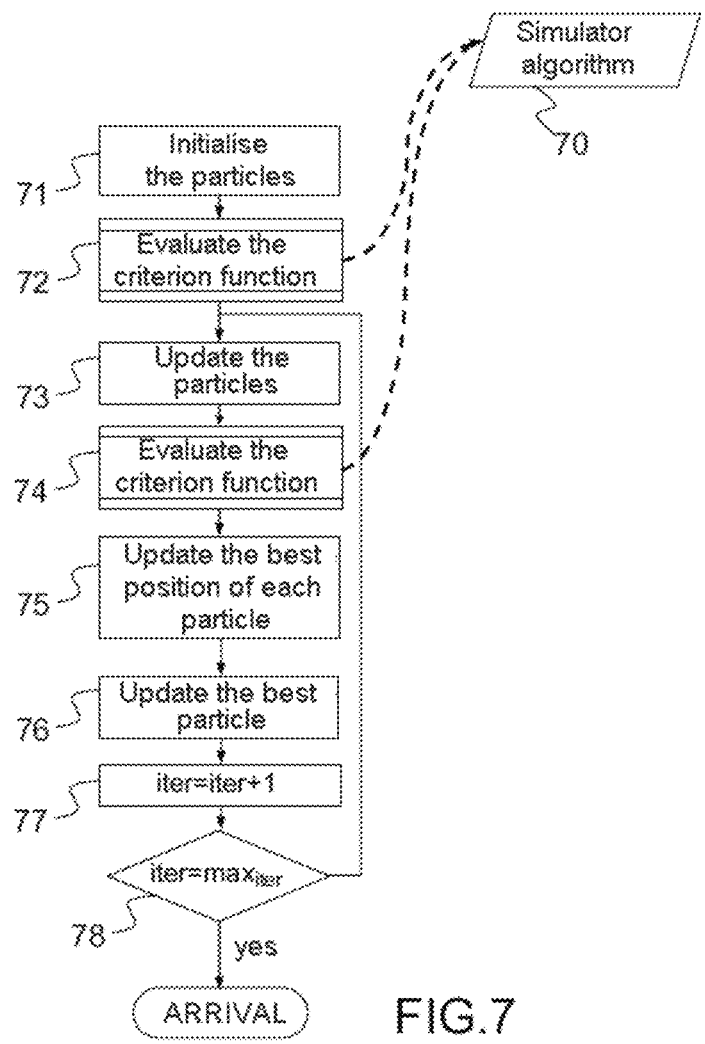
in FIG. 7, an example of an optimization algorithm.

FIG. 7 shows the optimization algorithm 65 in which, notably, the steps described above are found. All the particles, or solutions, are evaluated in terms of the criterion to be minimized, the optimization, and the constraints. This criterion and these constraints make use of a simulator of the vehicle, incorporating the driver's behavior, having its own algorithm 70, and being capable of determining the state of the system from a position X(i) to a position Xf The simulator 70 includes the behavioral model of the driver.

The use of the simulator within the optimization algorithm is illustrated, notably, in FIG. 7. In an initial step 71, the particles are initialized. This step is followed by a step 72 of evaluating the initialized particles according to the optimization criterion and the constraints, using the simulator 70. This step is followed by a step 73 of updating the particles according to the preceding system of equations (Eq1). It is followed by an evaluation step 74. This step evaluates the new particles according to the optimization criterion and according to the constraints, using the simulator 70. This evaluation step is followed by a step 75 of updating the best position of each particle, which is itself followed by a step 76 of updating the best particle of the swarm. After this step 76, the algorithm moves to the next iteration 77, looping back to the particle updating step 73. When the maximum iteration is reached 78, the algorithm stops.

Figure 8:
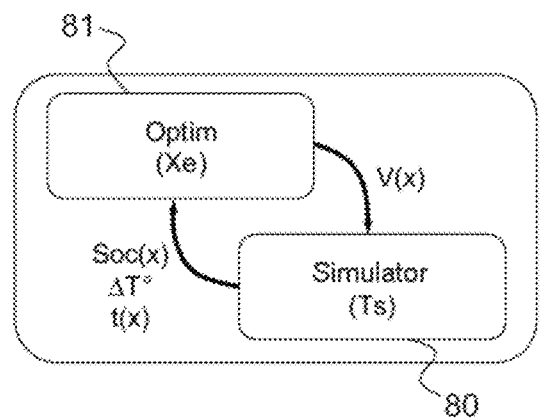
in FIG. 8, an illustration of the interaction between the optimization algorithm and a simulation of the state of a vehicle over a route not yet travelled.

FIG. 8 shows the interaction between the meta-heuristic 81, corresponding to the optimization algorithm of FIG. 7 for example, and the simulator 70.

The simulator 70 serves, notably, to predict the energy consumption of the propulsion system and the heating, and more generally that of all the auxiliaries, for the remainder of the journey, taking the driver's behavior into account. This simulator is intended to be called as many times as there are particles at each iteration of the particle swarm algorithm. The total number of calls of the simulator may thus reach several thousand for a given scenario. The cycle time of the simulation must be compatible with the different sampling parameters. For the sake of simplicity, the modeling may be limited, in a first approximation, to the behavioral model of the vehicle and only those of its elements which consume most of the battery energy, that is to say the propulsion system and the heating, as well as to the driver model whose characteristics are those of the speed corrector 25. In a more general context, taking into account other auxiliary equipment, the energy consumed by the latter may be negligible.

In the following paragraphs, the synthesis of a propulsion system simulator is considered. For the analytical expression of the vehicle model, the following simplifying hypotheses are used:

Longitudinal dynamics: An exhaustive modeling of the drive system of a vehicle takes into account the six degrees of freedom of the vehicle and decouples the vehicle dynamics from that of the four wheels. This results in a tenth-order differential equation. In order to simplify the model before loading it into a vehicle computer EGV, only the longitudinal dynamics of the vehicle is modeled.

Zero slippage on the road surface: The distinction between the dynamics of the vehicle and of the wheels (recognition of the slippage between wheels and road surface) is relevant only if the ABS has to be modeled.

According to the preceding simplifying hypotheses, four subsystems of the propulsion system may be identified:
The motor and its adjustable speed drive
The mechanical transmission
The longitudinal dynamics of the vehicle
A model of the battery Regarding the equations governing these different subsystems:

Servomotor: The power losses of an asynchronous motor are not fixed but are functions of the torque and the motor speed. A static map represents the behavior and the efficiency of the motor. This enables the electrical power consumed by the motor at each instant to be identified.

Mechanical transmission: The transmission is modeled by a speed gain corresponding to the ratio denoted N of the motor speed (rd/s) and vehicle speed (m/s), and a torque gain which is the ratio of the motor torque (N.m) and the vehicle force (N). The gains in force and speed are assumed to be identical, the losses being modeled at the level of the motor.

Dynamics of the vehicle: When the vehicle dynamics has been reduced to its longitudinal component only, without slippage, it can be described by the following first-order non-linear differential (quadratic dynamic) equation:

$$M\ddot{X} = \pm F_t - f_s \cos(\beta)\text{sign}(\dot{X}) - f_{aero}\dot{X}|\dot{X}| - Mg\sin(\beta)$$

where:

M: Sum of the mass of the vehicle and the rotational inertia (motor, transmission, wheel) related to a total mass in translation
$F_t$: Tractive force or braking force, depending on the sign
$f_s$: Dry friction torque
$f_{aero}$ Aerodynamic resistance coefficient
$\beta$: gradient of the road at the current instant
Battery: The state of charge of the battery, also called SOC, is the difference between the total stored charge and the charge consumed by the various elements connected to it, namely:

$$SOC(t) = SOC_0 - \int I dt$$

where I(t) is the current passing through the motor, U(t) is the voltage at the motor terminals, and $E_0$ is a function of temperature notably. Initially, however, it may be considered constant, although the possibility of introducing the characteristic $SOC_0 = f(T°)$ subsequently is kept in reserve.

If the equations of the different equations governing the subsystems are established, the parameter setting of the model is carried out for these subsystems.

Motor: By way of example, we will consider an ABM asynchronous motor with a power of about 15 kW. A series of measurements provides a map of the power losses as a function of the speed and the motor torque. This map takes the form of a 3D surface which is a function of the speed and the motor torque; it is numbered and stored in the system. To reduce computing time, the map may be interpolated in the form of polynomial equations to describe the 3D surface.

Mechanical transmission: The following ratio parameter N:

$$N = \frac{TractiveForce}{MotorTorque} = \frac{MotorSpeed}{VehicleSpeed}$$

defines the transmission gain and corresponds to the ratio of the speed reducer gain to the radius of the drive wheel.

Dynamics of the vehicle:
Mass: $M = M_{empty} + M_{Batterypack} + M_{Payload} = 500 + 140 + 200 = 840$ kg
Dry friction coefficient: $f_s = 0.3$
Aerodynamic coefficient: $f_{aero} = C_x S = 0.3 \times 1.5 = 0.45 \text{N·m}^{-2} \cdot \text{s}^2$ a.

Battery: The battery used is, for example, composed of 10 cells with a rating of 1.766 KWh each, and therefore $E_0 = 10 \times 1.766 = 17.66$ kWh = 63576 megajoules.

Let us now return to FIG. 8. The output of the simulator 70 forms an input of the optimization algorithm 51, in the sense that the simulator calculates a state of the system (notably, the speed V(x), temperature t(x), or SOC(x)) for the sampled positions X(i) up to Xf; this state represents the energy environment of the vehicle. This state is used for the evaluation of the updated particles. Similarly, the output of the optimization algorithm forms an input of the simulator, in the sense that the algorithm supplies the optimum speed and heating setting to the simulator for the execution of the vehicle simulation, this state (vehicle speed, heating setting) being defined in step 76 in which the best particle is updated. In applications recognizing auxiliary equipment other than the heating, this state or energy environment would recognize the output variables of these items of equipment, for example the sound volume of a car radio or the output temperature of an air conditioning unit. The simulation is also carried out on the basis of the traffic conditions on the remainder of the route, such as the climatic conditions or the traffic density.

The behavior of the vehicle is governed by non-linear temporal differential equations. These temporal equations are sampled according to a simulation time interval Ts before their numerical integration is carried out. Ts is, for example, about 2 seconds. As for the particle swarm optimization algorithm, this samples the different states (notably the torque, speed and SOC) at the spatial interval Xe, the setpoints being refreshed at the interval of the samples XL. The meta-heuristic 81 and the simulator 70 exchange input and output data. The same states are therefore expressed in two different spaces, namely the temporal and spatial spaces. The inputs/outputs of one module 81 must be compatible with the inputs/outputs of the other module 70.

The change from data expressed in the temporal space to a spatial space does not give rise to any particular problems. When all the states in the temporal domain have been obtained, the position vector as a function of time is available, the correspondence between the spatial and the temporal information then being defined. The different values of the state vectors calculated at successive instants are thus interpolated as a function of the position Xe(j).

The reverse change, from the spatial space to the temporal space, is required in order to determine the speed and heating setpoint to be considered on each temporal iteration of the simulator. It is assumed that, at the zero instant, the position is also zero, i.e. $V_{véhicule}(x=0)=V_{véhicule}(t=0)$, where $V_{véhicule}$ is the speed of the vehicle. At each iteration, the new position of the vehicle is calculated and compared with the spatial samples corresponding to setpoint changes. If there is a correspondence, the setpoint speed for the next temporal iteration of the simulator is re-estimated with the corresponding torque assigned to this critical position in the setpoint vector $v=f(x)$.

Since the objective of the simulator is to estimate the speeds and SOC over a route whose final position is known, the simulator output condition is spatial, not temporal. It should be noted that, in certain untypical cases envisaged by the stochastic optimization method, the vehicle may not reach the destination, and therefore an output condition must be added on a maximum number of iterations.

Figure 9:
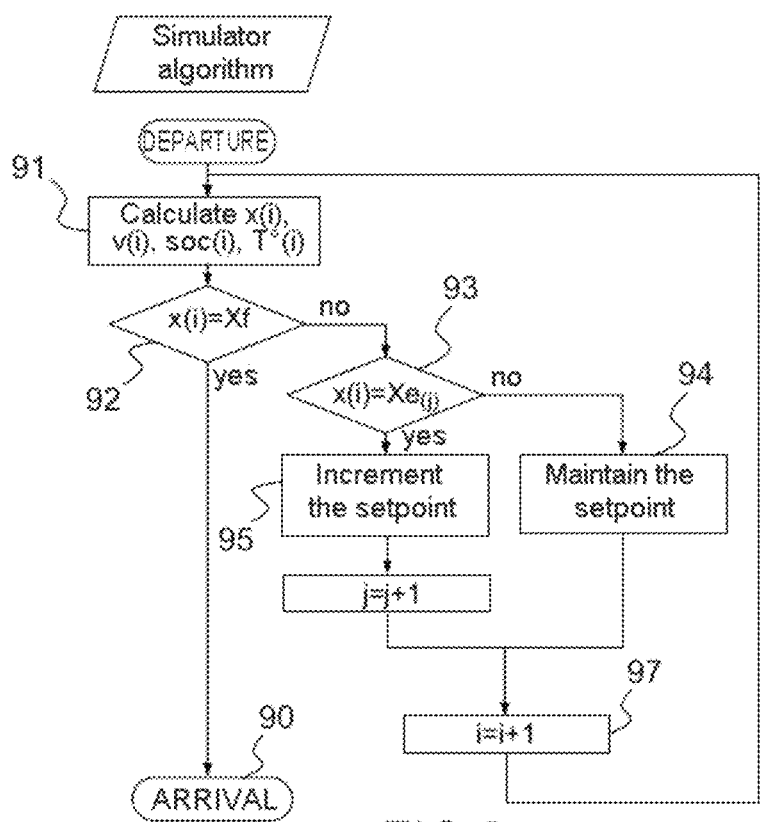
in FIG. 9, an example of a simulation algorithm.

FIG. 9 shows the algorithm of the operation of the simulator 70 according to the above description. In particular, at the temporal sampling instant of order i, the simulator calculates, in a first step 91, the position X(i) of the vehicle, the speed V(i) of the vehicle, the state of charge of the batteries SOC(i), and the temperature T°(i) inside the passenger compartment, using sensors known to those skilled in the art. The data V(i), SOC(i) and T°(i) are transmitted to the optimization algorithm.

X(i) is then compared 92 to Xf in order to determine whether the vehicle has reached the destination 90. If this is not the case, X(i) is compared 93 to the next sampled position Xe(j). If X(i) is different from Xe(j), the setpoint is maintained. In the contrary case, X(i) is substantially equal to Xe(j), and the setpoint is incremented 95 and is maintained until the next spatial interval. The index j is then incremented by unity 1, so that the next comparison 93 will be performed with Xe(j+1). At the next temporal sampling instant 97, the algorithm loops back to the first step 91 of calculating the position, speed, state of charge and temperature, i.e. X(i+1), V(i+1), SOC(i+1) and T°(i+1).

The temporal sampling period is the sampling period mentioned above, and may be equal to the period Te used for the general algorithm shown in FIG. 6.

Figure 10:
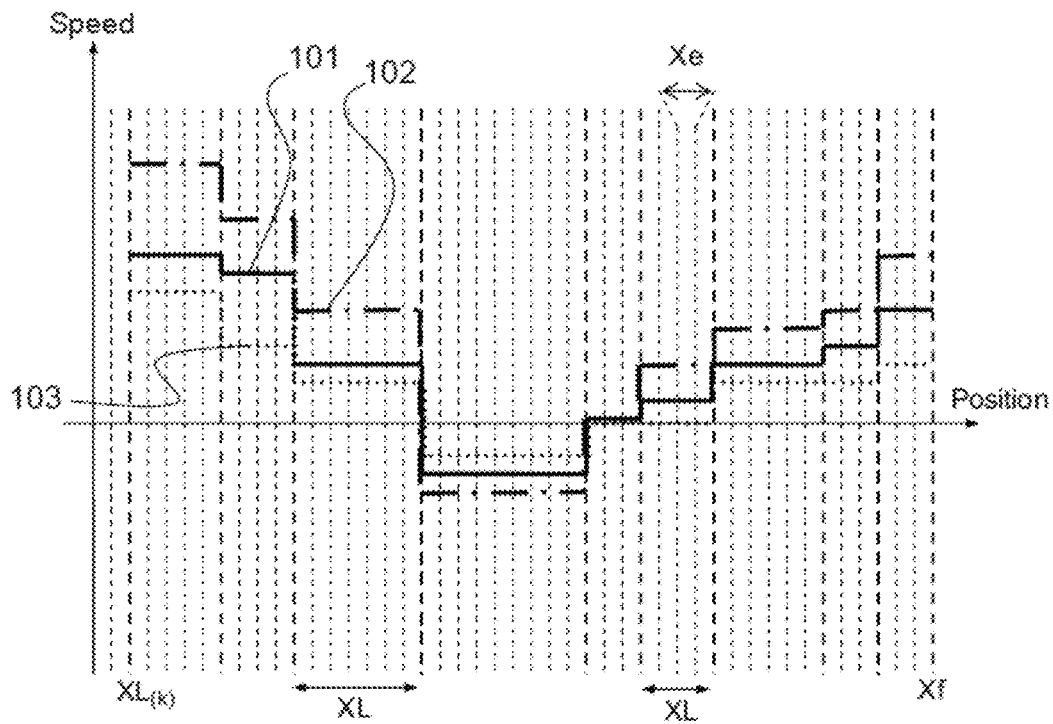
in FIG. 10, an example of a result of energy management according to the invention in the form of a display of three trajectories, providing speed setpoints to be applied.

FIG. 10 shows an example of a final result of the optimization strategy at a given instant or at a given position; in this example it is at the position XL(k). This result shows the three optimal trajectories, namely the middle trajectory 101, the high trajectory 102 and the low trajectory 103. These trajectories shows the value of the requested speed as a function of the position. Each trajectory predicts the optimal speed values from the position XL(k) to the end of the route at the position Xf, the optimal speed values being refreshed, that is to say recalculated, once every XL. They are calculated to minimize the consumption, and/or the journey time, and/or to provide the maximum comfort, while taking the driver's behavior into account, using the strategy implemented by the method according to the invention as described above. On the basis of the objectives specified at the outset and the constraints related to the journey.

These three sets of trajectories are returned to the driver so that he can adapt his driving style. They are preferably not returned in the raw form as shown in FIG. 10. They may be returned in a user-friendly form suitable for the situation of a motor vehicle driver, for example in the form of voice instructions or visual instructions, and if visual they should be easy to read.

The algorithms executing the method according to the invention are, for example, implemented in an on-board computer in the vehicle, in the UCVE for example, this computer being interfaced with the various sensors supplying the necessary input data such as, notably, the positions, the speed, or the inside and outside temperatures for example, as well as the measurements of the battery state.

The invention claimed is:

1. A method of managing the energy consumed by an automotive vehicle, for a given route between a point of departure A and a point of arrival B, wherein said method uses at least:
 a simulation unit implemented by an onboard computer incorporating a vehicle model predicting a behavior of said vehicle and a driver model predicting a behavior of the driver of said vehicle, said driver model receiving at its input a speed setpoint to be attained and a speed of said vehicle measured at successive instants, and supplying a motor torque setpoint to said vehicle model which is a function of said speeds and of the modelled driver behavior; and
 an optimization algorithm implemented by the onboard computer interacting with said simulation unit;
 said method including a set of trajectories composed of a trajectory of said speed setpoint and at least a trajectory of a setpoint for controlling an item of auxiliary equipment, the trajectory of a setpoint describing a variation of said setpoint as a function of a position of the vehicle, said trajectories being calculated with respect to given objectives according to said optimization algorithm whose variables are formed from said setpoints, said method including a preliminary step comprising:
 a sub-step of storing an approximate profile of said route in a form of segments of straight lines in the onboard computer, forming a first sequences of sampled positions XL(k) along the route, a sampled position XL(k) corresponding to a movement from one segment to the next segment; and
 a sub-step of sampling with the onboard computer said profile according to a spatial interval Xe, forming a second sequence of sampled positions Xe(j) along the route, the sampled positions Xe(j) being located within the segments;

wherein the trajectories of said setpoints being recalculated with the onboard computer at each sampled position XL(k) of the first sequence according to the optimization algorithm, a simulation predicting the energy environment of the vehicle and the behavior of said driver up to the point of arrival B as a function of said setpoints and at least of the approximate profile of the remaining route, the optimization algorithm recognizing the result of the simulation for a calculation of the trajectories of said setpoints, said driver model being a speed corrector of a proportional integral (PID) type, including a correction representative of an anticipatory action of the driver in response to a type of event.

2. The method as claimed in claim 1, wherein said vehicle is propelled by means of a single energy source.

3. The method as claimed in claim 1, wherein the optimization algorithm is a particle swarm meta-heuristic, a particle being composed of said setpoints.

4. The method as claimed in claim 1, wherein the type of event is a change of gradient on said route.

5. The method as claimed in claim 1, wherein said driver model is calculated over at least a portion of said given route, said model being calculated by performing a linear regression based on the value of the applied motor torque, the measured speed of the vehicle, and the setpoint speed at points of said given portion.

6. The method as claimed in claim 1, wherein the segments of the approximated profile are a function of the elevation of the route and/or the changes in the speed limit.

7. The method as claimed in claim 6, wherein a segment represents a route section having a constant gradient and/or a constant speed limit.

8. The method as claimed in claim 1, wherein the predicted energy environment includes at least the state of the energy resource.

9. The method as claimed in claim 8, wherein the energy environment includes the speed of the vehicle, the remaining travel time and at least one output variable of an auxiliary item of equipment.

10. The method as claimed in claim 1, wherein the simulation is also carried out on the basis of the traffic conditions on the remainder of the route.

11. The method as claimed in claim 1, wherein a plurality of given objectives are each composed of a combination of one or more objectives included in a set of objectives (O1, O2, O3), a plurality of sets of trajectories are provided for the same setpoint, a trajectory being calculated with respect to a combination of objectives.

12. The method as claimed in claim 11, wherein the vehicle uses electrical energy, and the energy resource is electrical batteries, the combinations of objectives are created among the following objectives O1, O2, O3:

O1: to minimize the total electrical charge consumed by the batteries, the charge transmitted to the electric motor and the energy transmitted to the item of auxiliary equipment;

O2: to minimize the journey time between the point of departure A and the point of arrival B;

O3: to minimize the difference between the requested output of the item of auxiliary equipment and the actual output of said equipment.

13. A system for managing the energy consumed by an automotive vehicle over a given route, wherein said system comprises;

a position determination device configured to capture a position of said vehicle on said route;

a measurement device configured to measure a torque applied by a motor of said vehicle and its speed;

an energy resource measurement device configured to measure a state of an energy resource of said vehicle;

an auxiliary equipment information output device configured to output information from at least one item of auxiliary equipment;

a computer provided onboard said vehicle and interfaced with said devices, said computer incorporating:

a simulation unit incorporating a vehicle model predicting a behavior of said vehicle and a driver model predicting a behavior of the driver of said vehicle, said driver model receiving at its input a speed setpoint to be attained and the speed of said vehicle measured at successive instants, and supplying a motor torque setpoint to said vehicle model which is a function of said speeds and a function of the modelled driver behavior; and an optimization algorithm interacting with said simulation unit;

said system including a set of trajectories composed of a trajectory of said speed setpoint and at least a trajectory of a setpoint for controlling an item of auxiliary equipment, the trajectory of a setpoint describing a variation of said setpoint as a function of a position of the vehicle, said trajectories being calculated with respect to given objectives according to said optimization algorithm hose variables are formed from said setpoints;

said system configured to store an approximate profile of said route in a form of segments of straight lines in the onboard computer, forming a first sequences of sampled positions XL(k) along the route, a sampled position XL(k) corresponding to a movement from one segment to the next segment; and said system configured to sample with the onboard computer said profile according to a spatial interval Xe, forming a second sequence of sampled positions Xe(j) along the route, the sampled positions Xe(j) being located within the segments, wherein the trajectories of said setpoints being recalculated with the onboard computer at each sampled position XL(k) of the first sequence according to the optimization algorithm, a simulation predicting the energy environment of he vehicle and the behavior of said driver us to the point of arrival B as a function of said setpoints and at least of the approximate profile of the remaining route, the optimization algorithm recognizing the result of the simulation for a calculation of the trajectories of said setpoints, said driver model being a speed corrector of a proportional integral (PID) type, including a correction representative of an anticipatory action of the driver in response to a type of event.

* * * * *

UNITED STATES PATENT AND TRADEMARK OFFICE
CERTIFICATE OF CORRECTION

PATENT NO.        : 9,616,771 B2                                        Page 1 of 1
APPLICATION NO.   : 14/414065
DATED             : April 11, 2017
INVENTOR(S)       : Mathieu Grossard et al.

It is certified that error appears in the above-identified patent and that said Letters Patent is hereby corrected as shown below:

In the Claims

In Line 33, Column 18 in Claim 13, "algorithm hose variables" should be --algorithm whose variables--.

In Line 50, Column 18 in Claim 13, "environment of he vehicle," should be --environment of the vehicle--.

In Line 51, Column 18 in Claim 13, "said driver us to the point" should be --said driver up to the point--.

Signed and Sealed this
Twenty-third Day of May, 2017

Michelle K. Lee
*Director of the United States Patent and Trademark Office*